United States Patent
Wu et al.

(10) Patent No.: US 9,804,958 B2
(45) Date of Patent: Oct. 31, 2017

(54) DATA PROCESSING APPARATUS AND DATA PROCESSING METHOD

(71) Applicant: MediaTek Inc., Hsin-Chu (TW)

(72) Inventors: Jih-Sheng Wu, Dapi Township, Yunlin County (TW); Chan-Hao Chang, Hsinchu (TW); Da-Yu Chiu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 338 days.

(21) Appl. No.: 14/546,196

(22) Filed: Nov. 18, 2014

(65) Prior Publication Data

US 2016/0139816 A1    May 19, 2016

(51) Int. Cl.
| G06F 12/00 | (2006.01) |
| G06F 12/02 | (2006.01) |
| G06F 12/06 | (2006.01) |
| G06F 9/34  | (2006.01) |

(52) U.S. Cl.
CPC ............ *G06F 12/0215* (2013.01); *G06F 9/34* (2013.01); *G06F 12/023* (2013.01); *G06F 12/0692* (2013.01); *Y02B 60/1225* (2013.01)

(58) Field of Classification Search
None
See application file for complete search history.

(56) References Cited

U.S. PATENT DOCUMENTS

2014/0298340 A1* 10/2014 Imaizumi ............ G06F 12/0284
                                                                 718/1
2015/0293859 A1* 10/2015 Huang ................. G06F 3/0622
                                                                 711/163

\* cited by examiner

*Primary Examiner* — Midys Rojas
(74) *Attorney, Agent, or Firm* — McClure, Qualey & Rodack, LLP

(57) ABSTRACT

A data processing apparatus for accessing a plurality of memories is provided. The data processing apparatus includes a function control circuitry and an address generation circuitry. The function control circuitry is utilized to record a first memory address where a first function is implemented after the first function is implemented and to determine which one of the plurality of memories is a target memory according to the first memory address. The address generation circuitry is utilized to output the first memory address to the target memory. In addition, the function control circuitry is configured to determine the target memory in the same processing cycle in which the address generation circuitry is configured to output the first memory address.

20 Claims, 9 Drawing Sheets

| CYCLE 1 | CYCLE 2 | CYCLE 3 |
|---|---|---|
| Processor outputs fetch memory address to MPU and outputs fetch memory address to the first memory or second memory according to the prediction logic | MPU determines which memory the fetch memory address is located. If the prediction is correct, the first memory or second memory outputs fetch data to processor. If the prediction is not correct, processor re-outputs fetch memory address to the first memory or second memory according to MPU | The first memory or second memory outputs fetch data to processor if the prediction is not correct |

FIG. 1C

DATA PROCESSING APPARATUS AND DATA PROCESSING METHOD

TECHNICAL FIELD

This disclosure relates generally to a data processing apparatus and, more particularly, to an effective data processing method for accessing data corresponding to a fetch address and a target memory.

BACKGROUND

Utilizing a memory protection unit (MPU) or a memory management unit is well-known for controlling memory access in data processing systems. It takes time for the MPU or the memory management logic to determine the target memory address. Specifically, it takes several processing cycles before data corresponding to the target memory address can be located as being stored in a particular one of the plurality of memories and thus be accessed. The data access time can become a time critical path that limits the performance of the data processing system. In addition, power consumption is another critical path if more than one of the plurality of memories is accessed.

Therefore, a high performance and low power consumption method is needed for accessing memories and fetching data. Accordingly, a data processing apparatus to improve the efficiency and performance of data access and to reduce the circuit area in the device is also needed.

SUMMARY OF THE INVENTION

In one embodiment, the present invention provides a data processing apparatus for accessing a plurality of memories. The data processing apparatus includes a function control circuitry and an address generation circuitry. The function control circuitry is utilized to record a first memory address where a first function is implemented after the first function is implemented and to determine which one of the plurality of memories is a target memory according to the first memory address. The address generation circuitry is utilized to output the first memory address to the target memory. In addition, the function control circuitry is configured to determine the target memory in the same processing cycle in which the address generation circuitry is configured to output the first memory address.

In another embodiment, the present invention provides a data processing method utilized for a data processing apparatus to access a plurality of memories. The data processing method includes recording a first memory address where a first function is implemented after the first function is implemented; determining which one of the plurality of memories is a target memory according to the first memory address; and outputting the first memory address to the target memory wherein the function control circuitry is configured to determine the target memory in the same processing cycle in which the address generation circuitry is configured to output the first memory address.

In another embodiment, the present invention provides a data processing apparatus for accessing a plurality of memories. The data processing apparatus includes a core circuitry, a function control circuitry and an address generation circuitry. The core circuitry is utilized to output a fetch memory address. The function control circuitry is utilized to receive the fetch memory address and determine one of the plurality of memories as a target memory which the fetch memory address is located by recording the target memory when it is accessed. The address generation circuitry is utilized to output the fetch memory address to the target memory.

In another embodiment, the present invention provides a data processing apparatus for accessing a plurality of memories. The data processing apparatus includes an address generation circuitry and a function control circuitry. The address generation circuitry is utilized to output a fetch memory address to a target memory. The function control circuitry is utilized to determine one of the plurality of memories as the target memory corresponding to data to be accessed by recording which one of the plurality of memories is recently implemented and assigning the recently accessed memory as the target memory.

The effective data processing method provided by the present invention can improve the accuracy of fetching data and reduce power consumption.

BRIEF DESCRIPTION OF THE DRAWINGS

FIG. 1C illustrates another cycle timing diagram representing the data processing method according to the present invention.

DETAILED DESCRIPTION

Certain terms and figures are used throughout the description and following claims to refer to particular components. As one skilled in the art will appreciate, manufacturers may refer to a component by different names. This document does not intend to distinguish between components that differ in name but not function. The terms "component", "system" and "device" used in the present invention could be the entity relating to the computer which is a hardware, a software, or a combination of the hardware and the software. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
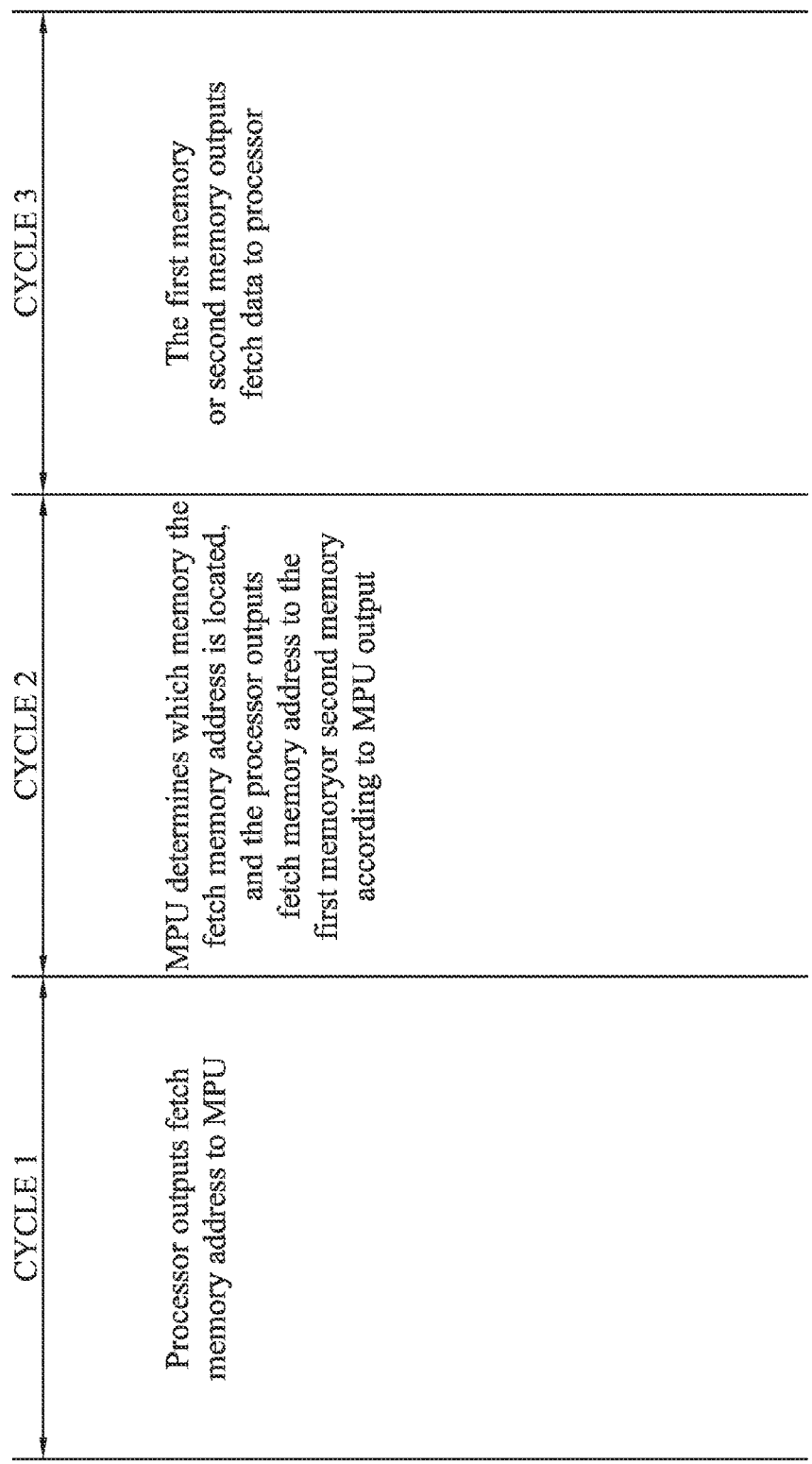
FIG. 1A illustrates a cycle timing diagram representing the data processing method according to the present invention.

FIG. 1A illustrates a cycle timing diagram representing the data processing method of an embodiment of the present invention. In the following embodiments, a processor and a MPU are used to access a first memory and a second memory. As shown in FIG. 1A, in the first processing cycle, the processor outputs a fetch address to the MPU. Afterwards, in the second processing cycle, the MPU determines which memory the fetch address is located in, and the processor outputs the fetch address to the first memory or second memory according to the output of the MPU. In the third processing cycle, the first memory or second memory outputs fetch data to processor. Because it takes three processing cycles for accessing memories and processing data, the data processing method of this example has poor performance.

Figure 1B:
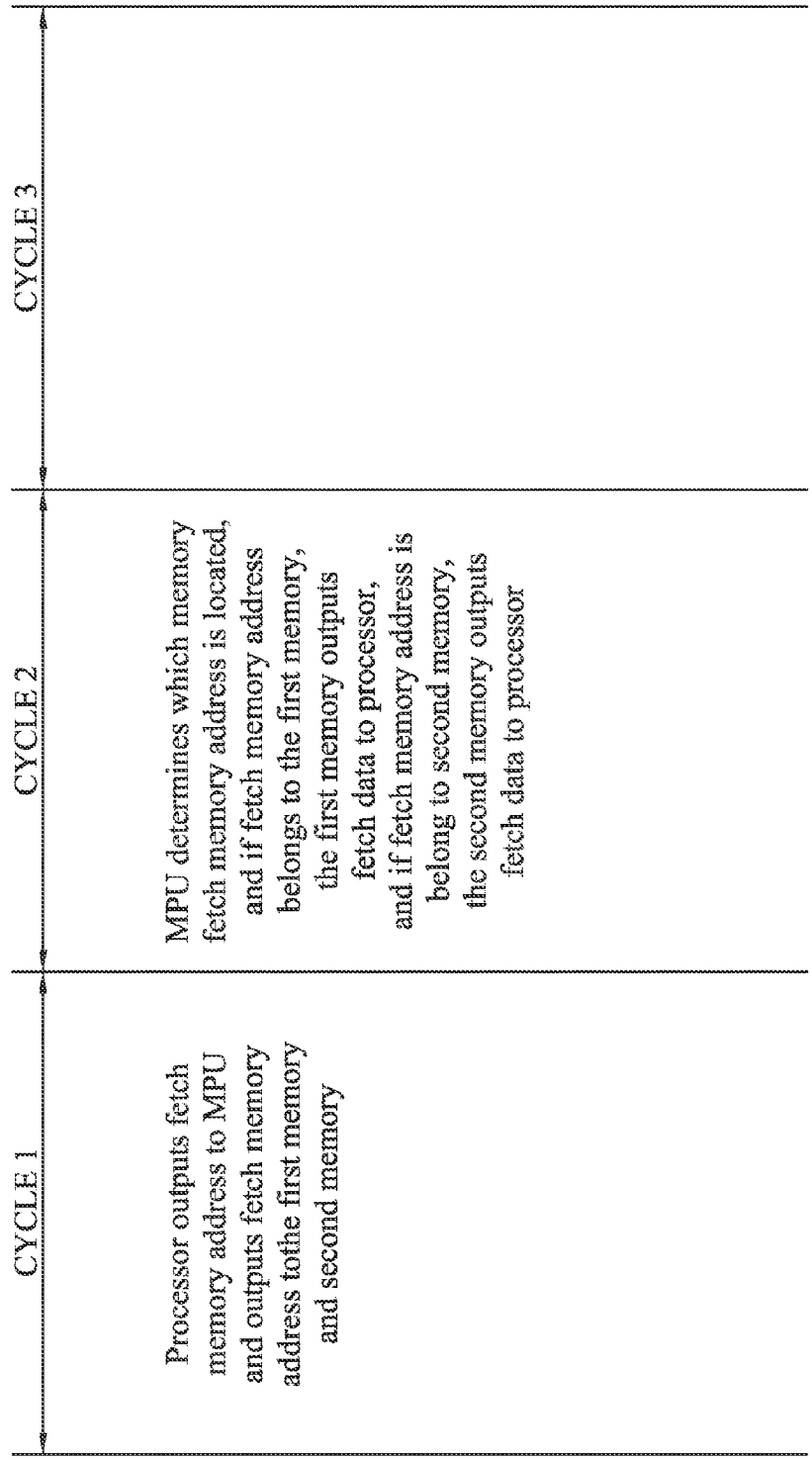
FIG. 1B illustrates another cycle timing diagram representing the data processing method according to the present invention.

FIG. 1B illustrates another cycle timing diagram representing the data processing method of an embodiment of the present invention. In the first processing cycle, the processor outputs a fetch address to MPU and outputs the fetch address to both the first memory and the second memory. Afterwards, in the second processing cycle, the MPU determines which memory the fetch address is located. For example, if the fetch address belongs to the first memory, the first memory outputs the fetch data to the processor. If the fetch address belongs to the second memory, then the second memory outputs the fetch data to the processor. Although the data processing method of this example shown in FIG. 1B has a better performance than the method shown in FIG. 1A, the data processing method of FIG. 1B has a high power consumption because the processor outputs the fetch address to both the first memory and the second memory in the first processing cycle.

FIG. 1C illustrates another cycle timing diagram representing the data processing method of an embodiment of the present invention. In the first processing cycle, as shown in FIG. 1C, the processor outputs the fetch address to the MPU, and outputs the fetch address to the first memory or the second memory according to the prediction logic. In the second processing cycle, the MPU determines which memory the fetch address is located in. If the prediction of the prediction logic is correct, the first memory or the second memory outputs the fetch data to the processor. If the prediction is not correct, the processor re-outputs the fetch address to the first memory or second memory according to the MPU. In this case, as shown in FIG. 1C, the first memory or second memory outputs the fetch data to the processor if the prediction is not correct. Therefore, if the prediction is correct, then it takes two processing cycles. But if the prediction is not correct, it will take one more processing cycle (three processing cycles in total) to access the memory and fetch data which would be low performance.

Figure 2:
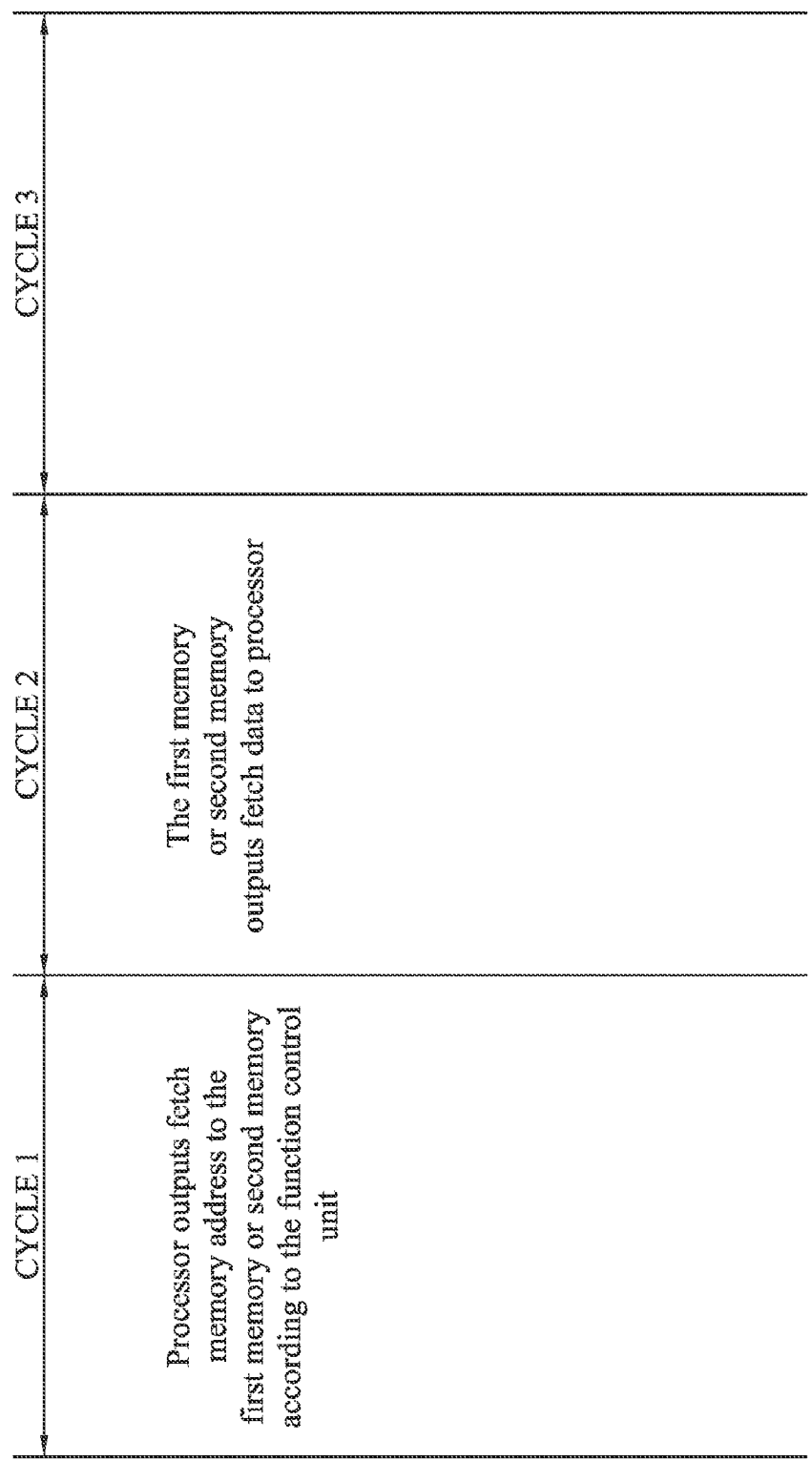
FIG. 2 illustrates the cycle timing diagram representing the data processing method according to the present invention.

FIG. 2 illustrates the cycle timing diagram representing the data processing method according to an embodiment of the present invention. In this embodiment as shown in FIG. 2, the processor outputs the fetch address to the first memory or the second memory according to the function control unit in the first processing cycle. Afterwards, in the second processing cycle, the first memory or the second memory outputs the fetch data to the processor.

Figure 3A:
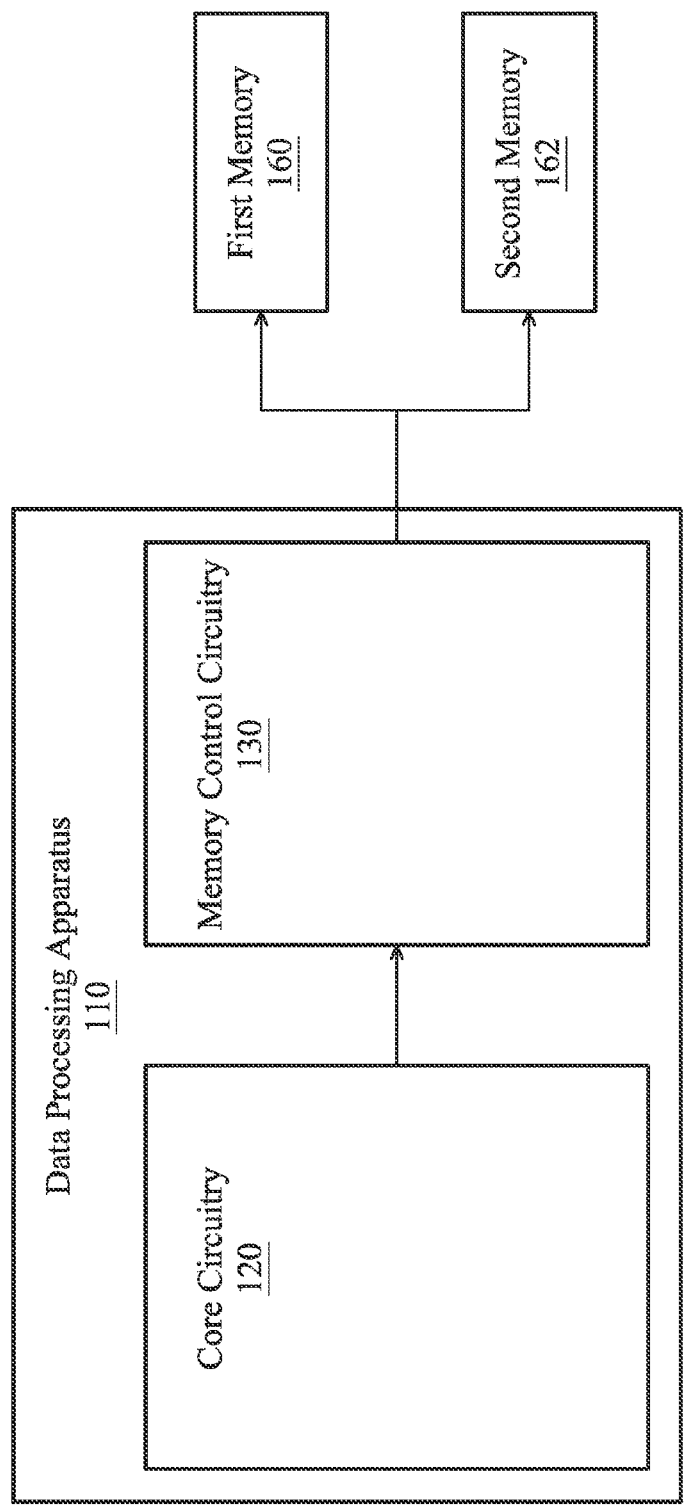
FIG. 3A illustrates a data processing apparatus and a plurality of memories in accordance with the embodiment of the present invention.

FIG. 3A illustrates a data processing apparatus and a plurality of memories in accordance with the embodiment of the present invention. As shown in FIG. 3A, the data processing apparatus 110 is utilized for accessing a plurality of memories, for example, the first memory 160 and the second memory 162. The data processing apparatus 110 includes the core circuitry 120 and the memory control circuitry 130. Specifically, the data processing apparatus 110 is a processor. For example, the data processing apparatus 110 could include a digital signal processor (DSP), a microcontroller (MCU), a central-processing unit (CPU) or a plurality of parallel processors relating the parallel processing environment to implement the operating system (OS), firmware, driver and/or other applications of an electronic device. In addition, the first memory 160 and the second memory 162 could be two separate memory devices or two memory regions of one memory device. Furthermore, the first memory 160 and the second memory 162 have different features or characteristics. For example, the first memory 160 is used to store frequently accessed instructions or data, and the second memory 162 is used to store non-frequently accessed instructions or data.

In one embodiment, the core circuitry 120 outputs a fetch memory address to the memory control circuitry 130. Afterwards, the memory control circuitry 130 receives the fetch memory address and determines one of the plurality of memories as a target memory which the fetch memory address is located by recording the target memory when it is accessed. After the memory control circuitry 130 determines the target memory, it outputs the fetch memory address to the target memory. In another embodiment, the core circuitry 120 outputs a fetch memory address to the memory control circuitry 130. Afterwards, the memory control circuitry 130 receives the fetch memory address and determines one of the plurality of memories as the target memory corresponding to data to be accessed by recording which one of the plurality of memories is recently implemented and assigning the recently accessed memory as the target memory. In addition, the memory control circuitry 130 outputs the fetch memory address to the target memory.

For example, the first memory 160 is recently implemented for accessing or fetching data. Such implementation of the first memory 160 is recorded by the memory control circuitry 130. Once the memory control circuitry 130 receives the fetch memory address from the core circuitry 120, it determines or assigns the first memory 160 as the target memory. In other words, the memory control circuitry 130 records or stores information about the target memory when it is accessed, and determines that the first memory 160 is the target memory which the fetch memory address is located by the recorded information of the target memory. It should be noted that the memory control circuitry 130 determines the target memory in the same processing cycle in which the memory control circuitry 130 outputs the fetch memory address. Afterwards, the target memory outputs data regarding the fetch memory address to the data processing apparatus 110 in the next processing cycle. Therefore, the data processing method of this embodiment exhibits high performance and low power consumption since it takes two processing cycles rather than three processing cycles and the fetch memory address is output to only one of the first memory or the second memory. Although the data processing method as shown in FIG. 1B also contains two processing cycles, it consumes more power because the fetch address is output to both the first memory and the second memory, not outputted to only one of the first memory or the second memory. In addition, the data processing method as shown in FIG. 1C may contain three processing cycle if the prediction is not correct. Since the data processing method of this embodiment is not featured by prediction but featured by recording the target memory when it is accessed, it provides higher reliability and better accuracy.

Figure 3B:
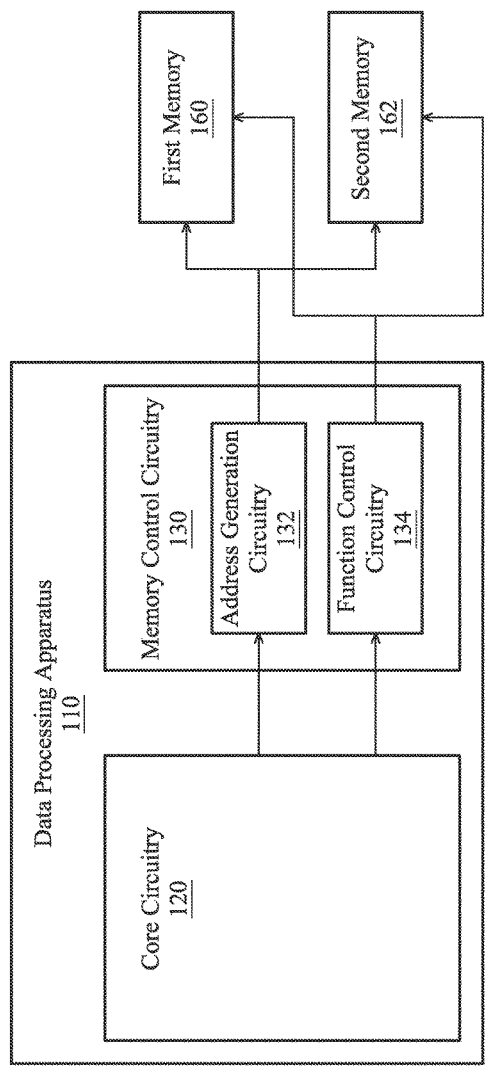
FIG. 3B illustrates a data processing apparatus and a plurality of memories in accordance with another embodiment of the present invention.

FIG. 3B illustrates a data processing apparatus and a plurality of memories in accordance with another embodiment of the present invention. In this embodiment, the memory control circuitry 130 includes the address generation circuitry 132 and the function control circuitry 134.

Specifically, the function control circuitry 134 is utilized to receive the fetch memory address from the core circuitry 120 and determines the target memory, and the address generation circuitry 132 is utilized to output the fetch memory address to the target memory. It should be noted that each circuitry of the present invention, such as the core circuitry 120, the memory control circuitry 130, the address generation circuitry 132 or the function control circuitry 134, could be composed of hardware components including a chip, a controller, a storage device and/or other necessary circuits.

In one embodiment, the function control circuitry 134 records a first memory address (fetch memory address) where a first function is implemented after the first function is implemented, and determines which of the plurality of memories is the target memory according to the first memory address. In addition, the address generation circuitry 132 outputs the first memory address to the target memory. The function control circuitry 134 determines the target memory in the same processing cycle in which the address generation circuitry 132 outputs the first memory address. Furthermore, after the address generation circuitry 132 outputs the first memory address to the target memory, the target memory outputs data regarding the first function to the data processing apparatus 110. Besides, it should be noted that the first function is stored on only one of the plurality of memories rather than stored on at least two memories, which means there is only one memory storing the whole first function.

In another embodiment, a second function is implemented after the implementation of the first function. Afterwards, the function control circuitry 134 records a second memory address where the second function is implemented after the second function is implemented, and determines which one of the plurality of memories is the target memory according to the second memory address rather than the first memory address. In other words, the function control circuitry 134 determines the target memory by recording which memory is recently accessed or implemented and assigning the recently accessed memory as the target memory. For example, in this embodiment, the function control circuitry 134 determines the target memory according to the second memory address rather than the first memory address.

Specifically, as shown in FIG. 3B, the address generation circuitry 132 outputs or transmits the first memory address to the first memory 160 and the second memory 162. In the same processing cycle, the function control circuitry 134 outputs or transmits a control signal to the first memory 160 and the second memory 162 for indicating the target memory. Since the first memory address and the control signal are transmitted in the same processing cycle, the performance for accessing data could be improved. On the other hand, although the first memory address is transmitted to both the first memory 160 and the second memory 162, the enable signal is utilized to identify that the first memory 160 or the second memory 162 is the target memory determined by the function control circuitry 134. Therefore, in most of the cases, only one of the first memory 160 and the second memory 162 will be accessed or implemented, which results in low memory bandwidth and low power consumption.

In another embodiment, the function control circuitry 134 further indicates whether the target memory is valid or not. Furthermore, Table 1 illustrates a memory identifier of the present invention.

TABLE 1

| Valid Flag | Memory ID |
|---|---|

The memory identifier is stored or recorded at the function control circuitry 134 for implementing or fetching data more efficiently and correctly. As shown in Table 1, the memory identifier includes the valid flag and the memory identification (memory ID). The size of the valid flag and the memory ID could be one bit respectively. The one bit of the valid flag is utilized to indicate whether the target memory is valid or not, and the one bit of the memory ID is utilized to indicate whether the target memory is the first memory 160 or the second memory 162. Namely, the memory ID indicates which memory would to be accessed or implemented. If more than two memories are accessed by the data processing apparatus 110, for example, then the size of the memory ID could be more than one bit for the identification. The sizes of the valid flag and the memory ID are for illustration but should not be limited hereto.

If the valid flag of the function control circuitry 134 indicates the target memory is valid, then the address generation circuitry 132 outputs the first memory address to the target memory indicated by the memory ID. If the valid flag of the function control circuitry 134 indicates the target memory is not valid, then the address generation circuitry 132 outputs the first memory address to each one of the plurality of memories, i.e. the first memory 160 and the second memory 162.

In another embodiment, the function control circuitry 134 further indicates whether the first function is going to be implemented, and the address generation circuitry 132 outputs the first memory address to each one of the plurality of memories when the first function is going to be implemented. Specifically, the implementation of the first function includes the initiation and/or the termination of executing the first function by the core circuitry 120. It is well-known that the initiation for the core circuitry 120 to execute or perform the first function is also called the "call" operation, and the termination for the core circuitry 120 to execute or perform the first function is also called the "return" operation.

Table 2 illustrates the data processing method with different cases of the present invention.

| | Call/Return | Valid Flag | Memory ID | Access Memory |
|---|---|---|---|---|
| Case 1 | 1 | X | X | First & second memory |
| Case 2 | 0 | 1 | 0 | First memory |
| Case 3 | 0 | 1 | 1 | Second memory |
| Case 4 | 0 | 0 | X | First & second memory |

In case 1, if the operation of "call" or "return" is implemented, then both the first memory 160 and the second memory 162 will be accessed regardless of the statuses of the valid flag and the memory ID. If the operation of "call" or "return" is not implemented, then the corresponding methods will be described in the following three cases. On the one hand, in the case 2, there is no operation of "call" or "return" and the valid flag of "1" indicates the memory ID is valid, then the first memory 160 will be accessed according to the memory ID of "0". On the other hand, in the case 3, there is no operation of "call" or "return" and the valid flag of "1" indicates the memory ID is valid, then the second memory 162 will be accessed according to the memory ID of "1". Furthermore, in the case 4, there is no operation of "call" or "return" and the valid flag of "0" indicates the memory ID is not valid, then both of the first memory 160 and the second memory 162 will be accessed.

It should be noted that as shown in Table 3.1, the address generation circuitry 132 outputs the first memory address to each one of the plurality of memories when there is no first memory address recorded on the function control circuitry 134.

TABLE 3.1

| Valid Flag | Memory ID | First Memory | Second Memory |
|---|---|---|---|
| 0 | X | Y | Y |
| 0 | X | Y | Y |
| 0 | X | Y | Y |

Since there could be no record or information stored at the function control circuitry 134 at the beginning, the valid flag would be "0" so that both of the first memory 160 and the second memory 162 would receive the first memory address from the address generation circuitry 132. Namely, in this case, both of the first memory 160 and the second memory 162 would be accessed.

On the one hand, Table 3.2 illustrates the data processing method when the operation of "call" occurs.

TABLE 3.2

| Valid Flag | Memory ID | First Memory | Second Memory |
|---|---|---|---|
| X | X | Y | Y |
| 1 | 0 | Y | N |
| 1 | 0 | Y | N |
| 1 | 0 | Y | N |

As illustrated in the case 1 of Table 2, when the operation of "call" is implemented, both of the first memory 160 and the second memory 162 will be accessed regardless the statuses of the valid flag and the memory ID as shown in the first row of Table 3.2. Afterwards, for example, the function control circuitry 134 determines that the valid flag and the memory ID are "1" and "0" respectively, which indicates that the first memory 160 is the target memory and will be accessed. In other words, after implementation of the operation of the "call" (the first function), the function control circuitry 134 records the start address (the first memory address) where the first function is implemented, which means in this embodiment, the valid flag and the memory ID of "1" and "0" are respectively stored or recorded into the function control circuitry 134.

On the other hand, Table 3.3 illustrates the data processing method when the operation of "return" occurs.

TABLE 3.3

| Valid Flag | Memory ID | First Memory | Second Memory |
|---|---|---|---|
| X | X | Y | Y |
| 1 | 1 | N | Y |
| 1 | 1 | N | Y |
| 1 | 1 | N | Y |

In another embodiment, when the operation of "return" is implemented, both of the first memory 160 and the second memory 162 will be accessed regardless the statuses of the valid flag and the memory ID as shown in the first row of Table 3.2. Afterwards, for example, the function control circuitry 134 determines that the valid flag and the memory ID are "1" and "1" respectively, which indicates that the second memory 162 is the target memory and will be accessed. In other words, after implementation of the operation of the "return" (the first function), the function control circuitry 134 records the return address (first memory address) where the first function is implemented, which means in this embodiment, the valid flag and the memory ID of "1" and "1" are respectively stored or recorded into the function control circuitry 134.

Figure 4:
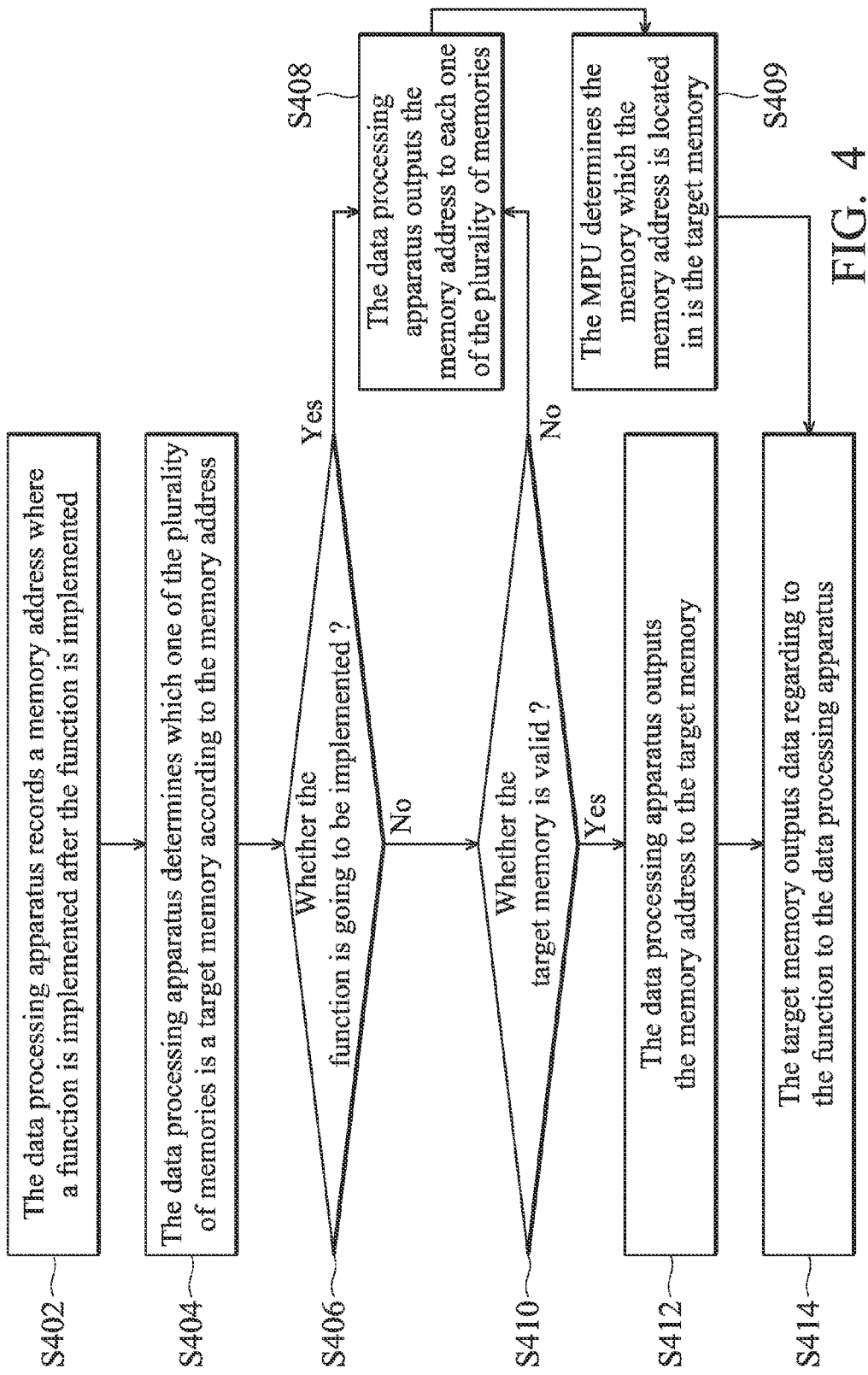
FIG. 4 illustrates a data processing method in accordance with an embodiment of the present invention.

FIG. 4 illustrates a data processing method in accordance with an embodiment of the present invention. In step S402, the data processing apparatus 110 (the processor) records a memory address where a function is implemented after the function is implemented. In step S404, the data processing apparatus 110 determines which one of the plurality of memories is a target memory according to the memory address. Afterwards, in step S406, whether the function is going to be implemented or not is determined. If the function is going to be implemented, step S408 is performed so that the data processing apparatus 110 outputs the memory address to each one of the plurality of memories. If the function is not going to be implemented, step S410 is performed so that whether the target memory is valid is determined. If the target memory is not valid, then step S408 is performed. If the target memory is valid, step S412 is performed that the data processing apparatus 110 outputs the memory address to the target memory. Finally, in step S414, the target memory outputs data regarding the function to the data processing apparatus 110. The methods about how to determine the target memory and its validity have been described before and will not be illustrated again. In addition, after performing step S408, step S409 is performed that the MPU determines the memory which the memory address is located in is the target memory. Afterwards, step S414 is performed that the target memory outputs data to the processor. For example, in this embodiment, the plurality of memories includes a first memory and a second memory. If memory address belongs to the first memory, then the first memory is determined as the target memory and outputs data to the processor. If memory address belongs to the second memory, then the second memory is determined as the target memory and outputs data to the processor.

Figure 5:
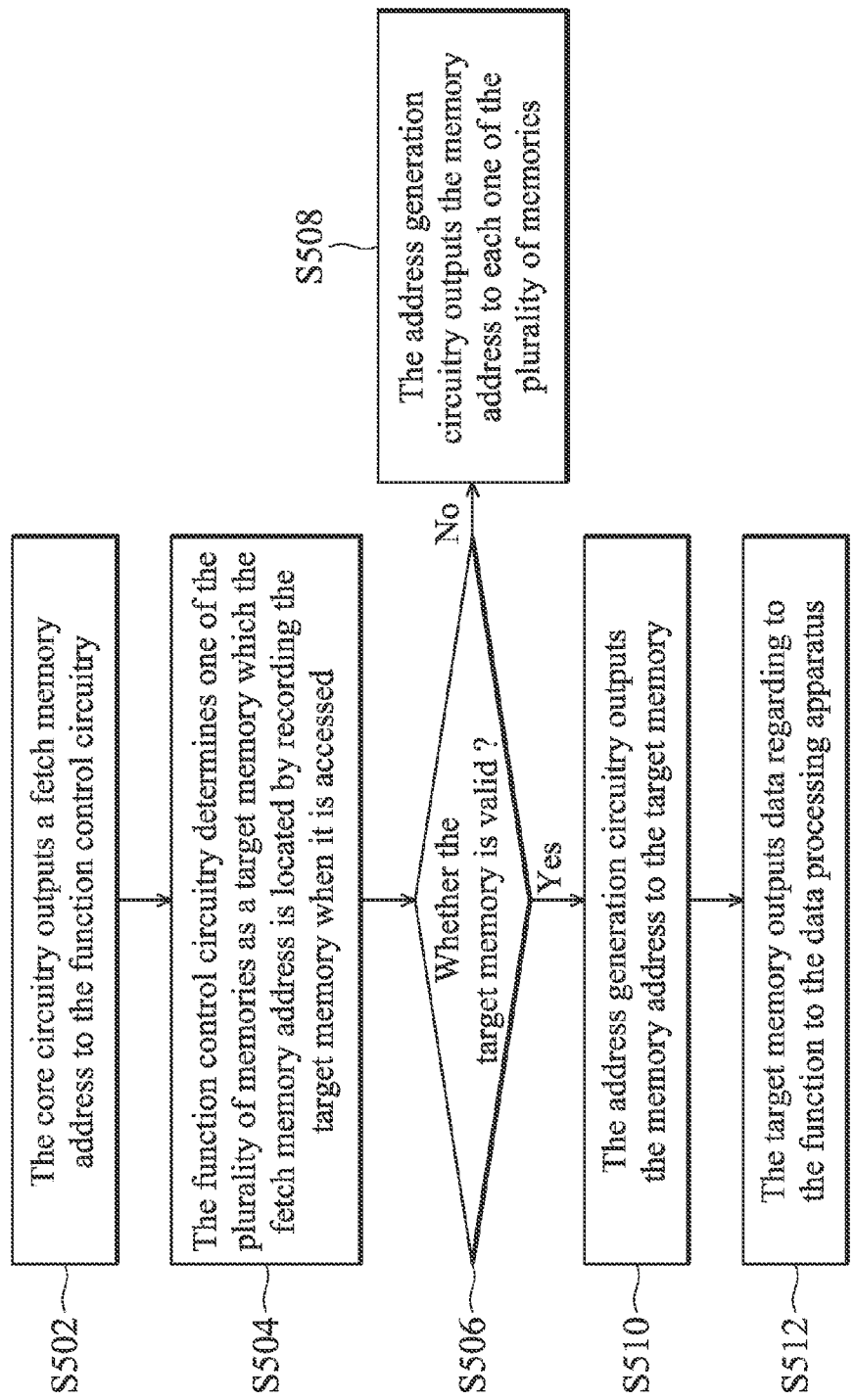
FIG. 5 illustrates a data processing method in accordance with another embodiment of the present invention.

FIG. 5 illustrates a data processing method in accordance with another embodiment of the present invention. In step S502, the core circuitry 120 outputs a fetch memory address to the function control circuitry 134. Afterwards, in step S504, the function control circuitry 134 determines one of the plurality of memories as a target memory which the fetch memory address is located by recording the target memory when it is accessed. In step S506, whether the target memory is valid is determined. If the target memory is not valid, step S508 is performed that the address generation circuitry 132 outputs the memory address to each one of the plurality of memories. If the target memory is valid, step S510 is performed that the address generation circuitry 132 outputs the memory address to the target memory. Finally, in step S512, the target memory outputs data regarding the function to the data processing apparatus 110. The methods about how to determine the target memory and its validity have been described before and will not be illustrated again.

Figure 6:
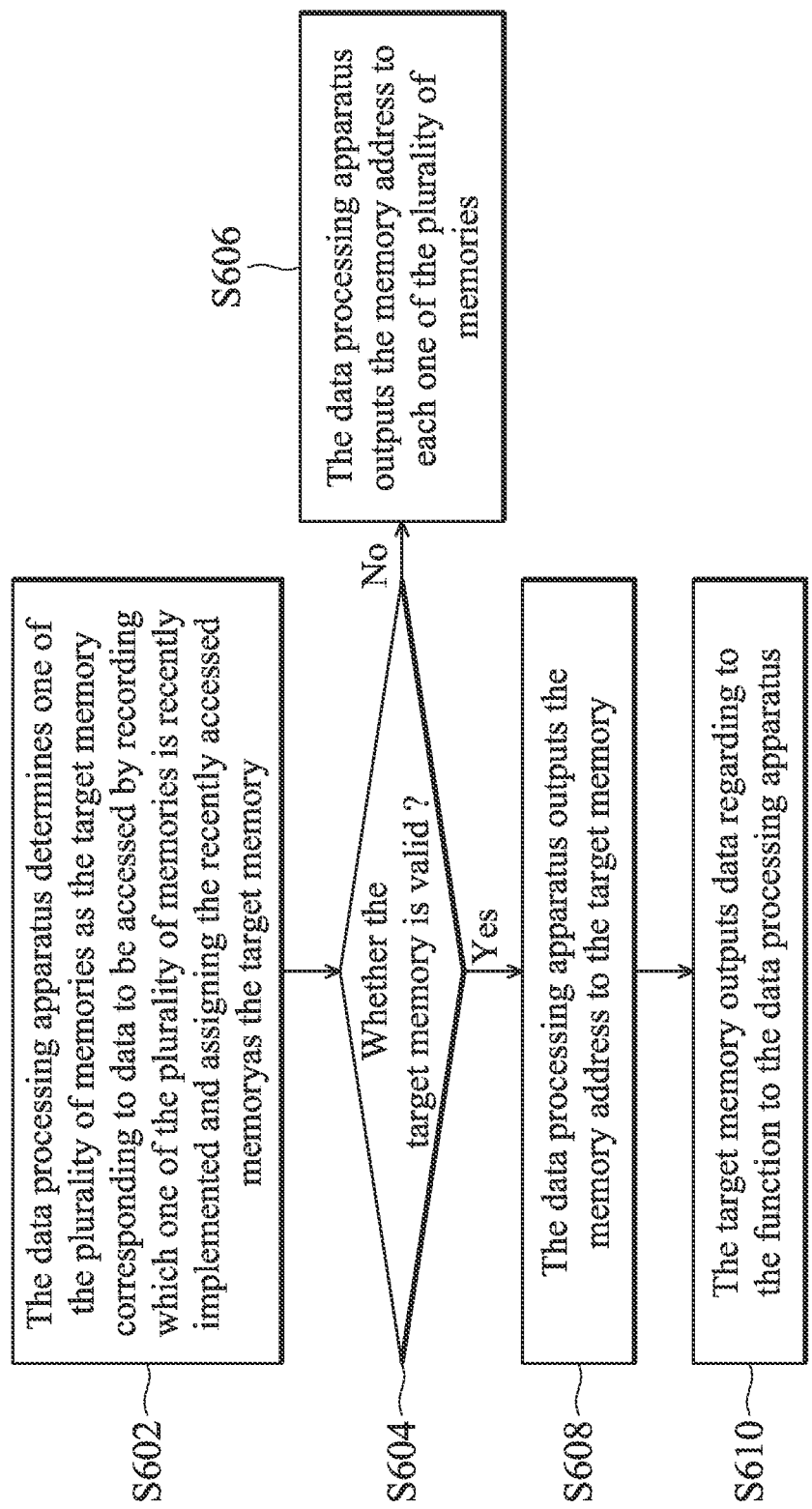
FIG. 6 illustrates a data processing method in accordance with another embodiment of the present invention.

FIG. 6 illustrates a data processing method in accordance with another embodiment of the present invention. In step S602, the data processing apparatus 110 determines one of the plurality of memories as the target memory corresponding to data to be accessed by recording which one of the plurality of memories is recently implemented and assigning the recently accessed memory as the target memory. Afterwards, in step S604, whether the target memory is valid is determined. If the target memory is not valid, step S606 is performed that the address generation circuitry 132 outputs the memory address to each one of the plurality of memories. If the target memory is valid, step S608 is performed that the address generation circuitry 132 outputs the memory address to the target memory. Finally, in step S610, the target memory outputs data regarding to the function to the data processing apparatus 110. The methods about how to determine the target memory and its validness are described before and will not be illustrated again.

Although the embodiments and their advantages have been described in detail, it should be understood that various changes, substitutions, and alterations can be made herein without departing from the spirit and scope of the embodiments as defined by the appended claims. The protection range of the present invention is based on the claims.

What is claimed is:

1. A data processing apparatus for accessing a plurality of memories, wherein the data processing apparatus comprises:
    a function control circuitry, utilized to record a first memory address where a first function is implemented in the function control circuitry after the first function is implemented and to determine which one of the plurality of memories is a target memory according to the first memory address; and
    an address generation circuitry, utilized to output the first memory address to the target memory, wherein the function control circuitry is configured to determine the target memory in the same processing cycle in which the address generation circuitry is configured to output the first memory address.

2. The data processing apparatus as claimed in claim 1, wherein when a second function is implemented after the implementation of the first function, the function control circuitry records a second memory address where the second function is implemented in the function control circuitry after the second function is implemented and determines which one of the plurality of memories is the target memory according to the second memory address rather than the first memory address.

3. The data processing apparatus as claimed in claim 1, wherein the function control circuitry further indicates whether the target memory is valid, and the address generation circuitry outputs the first memory address to the target memory when the function control circuitry indicates the target memory is valid.

4. The data processing apparatus as claimed in claim 3, wherein the address generation circuitry outputs the first memory address to each one of the plurality of memories when the function control circuitry indicates the target memory is not valid.

5. The data processing apparatus as claimed in claim 1, wherein before the address generation circuitry outputs the first memory address to the target memory, the function control circuitry further indicates whether the first function is going to be implemented, and the address generation circuitry outputs the first memory address to each one of the plurality of memories when the first function is going to be implemented.

6. The data processing apparatus as claimed in claim 5, wherein the data processing apparatus further comprises a core circuitry, and the first function comprises a call operation and/or a return operation executed by the core circuitry.

7. The data processing apparatus as claimed in claim 1, wherein the first function is stored at only one of the plurality of memories.

8. The data processing apparatus as claimed in claim 1, wherein before the function control circuitry records the first memory address where the first function is implemented, the address generation circuitry further executes to:
    output the first memory address to each one of the plurality of memories when there is no first memory address recorded on the function control circuitry.

9. The data processing apparatus as claimed in claim 1, wherein after the address generation circuitry outputs the first memory address to the target memory, the target memory outputs data regarding the first function to the data processing apparatus.

10. A data processing method, utilized for a data processing apparatus to access a plurality of memories, comprising:
    recording a first memory address where a first function is implemented in a function control circuitry of the data processing apparatus after the first function is implemented;
    determining which one of the plurality of memories is a target memory according to the first memory address; and
    outputting the first memory address to the target memory, wherein the target memory is determined in the same processing cycle in which the first memory address is outputted.

11. The data processing method as claimed in claim 10, further comprising recording a second memory address where a second function is implemented in the function control circuitry after the second function is implemented, and determining which one of the plurality of memories is the target memory according to the second memory address rather than the first memory address, wherein the second function is implemented after the implementation of the first function.

12. The data processing method as claimed in claim 10, further comprising indicating whether the target memory is valid, and outputting the first memory address to the target memory when the function control circuitry indicates the target memory is valid.

13. The data processing method as claimed in claim 12, further comprising outputting the first memory address to each one of the plurality of memories when the function control circuitry indicates the target memory is not valid.

14. The data processing method as claimed in claim 10, wherein before outputting the first memory address to the target memory, the data processing method further comprises:
    indicating whether the first function is going to be implemented; and
    outputting the first memory address to each one of the plurality of memories when the first function is going to be implemented.

15. The data processing method as claimed in claim 14, wherein the first function comprises a call operation and/or a return operation.

16. The data processing method as claimed in claim 10, further comprising storing the first function in only one of the plurality of memories.

17. The data processing method as claimed in claim 10, wherein before recording the first memory address in the function control circuitry, the data processing method further comprises:

outputting the first memory address to each one of the plurality of memories when there is no first memory address recorded on the function control circuitry.

18. The data processing method as claimed in claim 10, further comprising after outputting the first memory address to the target memory, outputting data regarding the first function to the data processing apparatus.

19. A data processing apparatus for accessing a plurality of memories, wherein the data processing apparatus comprises:
   a core circuitry, utilized to output a fetch memory address;
   a function control circuitry, utilized to receive the fetch memory address and determine one of the plurality of memories as a target memory which the fetch memory address is located by recording the target memory when it is accessed; and
   an address generation circuitry, utilized to output the fetch memory address to the target memory.

20. A data processing apparatus for accessing a plurality of memories, wherein the data processing apparatus comprises:
   an address generation circuitry, utilized to output a fetch memory address to a target memory; and
   a function control circuitry, utilized to determine one of the plurality of memories as the target memory corresponding to data to be accessed by recording which one of the plurality of memories is recently accessed and assigning the recently accessed memory as the target memory.

* * * * *